US008254658B2

(12) United States Patent
Hamilton

(10) Patent No.: US 8,254,658 B2
(45) Date of Patent: Aug. 28, 2012

(54) PAYEE DETECTION

(75) Inventor: Jarrett I. Hamilton, Saint Louis, MO (US)

(73) Assignee: Bank of America Corporation, Charlotte, NC (US)

( * ) Notice: Subject to any disclaimer, the term of this patent is extended or adjusted under 35 U.S.C. 154(b) by 1004 days.

(21) Appl. No.: 11/833,494

(22) Filed: Aug. 3, 2007

(65) Prior Publication Data

US 2009/0034826 A1 Feb. 5, 2009

(51) Int. Cl.
*G06K 9/00* (2006.01)
(52) U.S. Cl. ........................................................ 382/137
(58) Field of Classification Search ................... 382/137
See application file for complete search history.

(56) References Cited

U.S. PATENT DOCUMENTS 5,870,725 A 2/1999 Bellinger et al.
7,004,382 B2 2/2006 Sandru
7,216,801 B1 5/2007 Crews et al.
7,664,304 B2 * 2/2010 Houle et al. .................. 382/137
2001/0039534 A1 * 11/2001 Keene ............................ 705/45
2004/0000987 A1 * 1/2004 De Souza et al. .............. 340/5.8
2005/0097019 A1 5/2005 Jacobs

OTHER PUBLICATIONS

PCT International Preliminary Report on Patentability, PCT/US2008/072123, mailed Feb. 18, 2010, 9 pages.
PCT International Search Report, PCT/US 08/72123, mailed May 27, 2009, 11 pages.

* cited by examiner

*Primary Examiner* — Tom Y Lu
(74) *Attorney, Agent, or Firm* — Banner & Witcoff, Ltd; Michael A. Springs

(57) ABSTRACT

Methods, apparatuses, systems, and tangible computer readable media for processing note payables for fraud by searching an image file of a note payable for information in multiple zones on the image file and comparing the obtained information to corresponding information in the issue file that is associated with the note payable. The note payable may be a check and searching of the image file may be done by optical character recognition. However, a user may wish to search an image file of a note payable in multiple zones for desired information.

21 Claims, 5 Drawing Sheets

PAYEE DETECTION

FIELD OF THE INVENTION

Aspects of the disclosure relate to note payables. More specifically, aspects of the disclosure relate to processing note payables to protect against fraud.

BACKGROUND

Note payables have long been in existence and provide a convenient medium to transfer funds from one entity to another. However, note payables, such as checks, are susceptible to fraud. Checks can be altered to represent a different amount of money or to issue to a different payee than as originally contemplated. To provide a more reliable record of check issuance, some issuers of checks create issue files that include information about each check they issue. Issue files, usually in electronic format such as text file format, contain pertinent information of a check as originally issued such as the payee's name, money amount, and date. Banks that process deposited checks can compare the information written on a deposited check with its associated issue file to confirm that the deposited check has retained its original information as issued. By providing issue files, check issuers are better assured that fraudulently altered checks will be caught before they affect their accounts.

In an effort to compare received checks to their associated issue files more expediently, banks and other financial institutions that issue note payables have implemented automated processing schemes that electronically scan note payables for desired information and compare it to corresponding information in issue files. However, current automated processing schemes search for desired information in only one area of a note payable before moving on to process another note payable, leading to efficiency and flexibility issues. Therefore, there is a need in the art to provide greater flexibility in the automated processing of note payables to protect against fraud.

BRIEF SUMMARY

Aspects of the present disclosure address one or more of the issues mentioned above by disclosing methods, systems and computer readable media for processing image files of checks by searching multiple zones of an image file for information, then comparing the information with corresponding information from an issue file associated with the searched image file. The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one embodiment, a method is disclosed for receiving an image file and an associated issue file of a note payable, searching the image file in multiple zones for an anchor or a keyword, obtaining information associated with the anchor, comparing the information with corresponding information from the issue file, and sending out an indication that a payable note should be rejected, if the information from the image file and the corresponding information from the issue file do not match. In various embodiments in accordance with the disclosure, the matching may be loose matching (or loose comparing) of a predetermined number of characters in predetermined locations (e.g., the first five and last five characters).

In another embodiment, a system is disclosed comprising a station for receiving note payables, an electronic storage device for receiving an associated issue file, a scanning device for creating an image file corresponding to the note payable and a computing device comprising a memory and a processor wherein the memory has computer-executable instructions for the processor to perform.

In a further embodiment, in accordance with aspects of the disclosure, aspects of the invention may be provided in a computer-readable medium. For example, a computer-readable medium may comprise computer-executable instructions to perform one or more of the method steps described herein.

BRIEF DESCRIPTION OF DRAWINGS

The present disclosure is illustrated by way of example and not limited in the accompanying figures in which.

DETAILED DESCRIPTION

Figure 1:
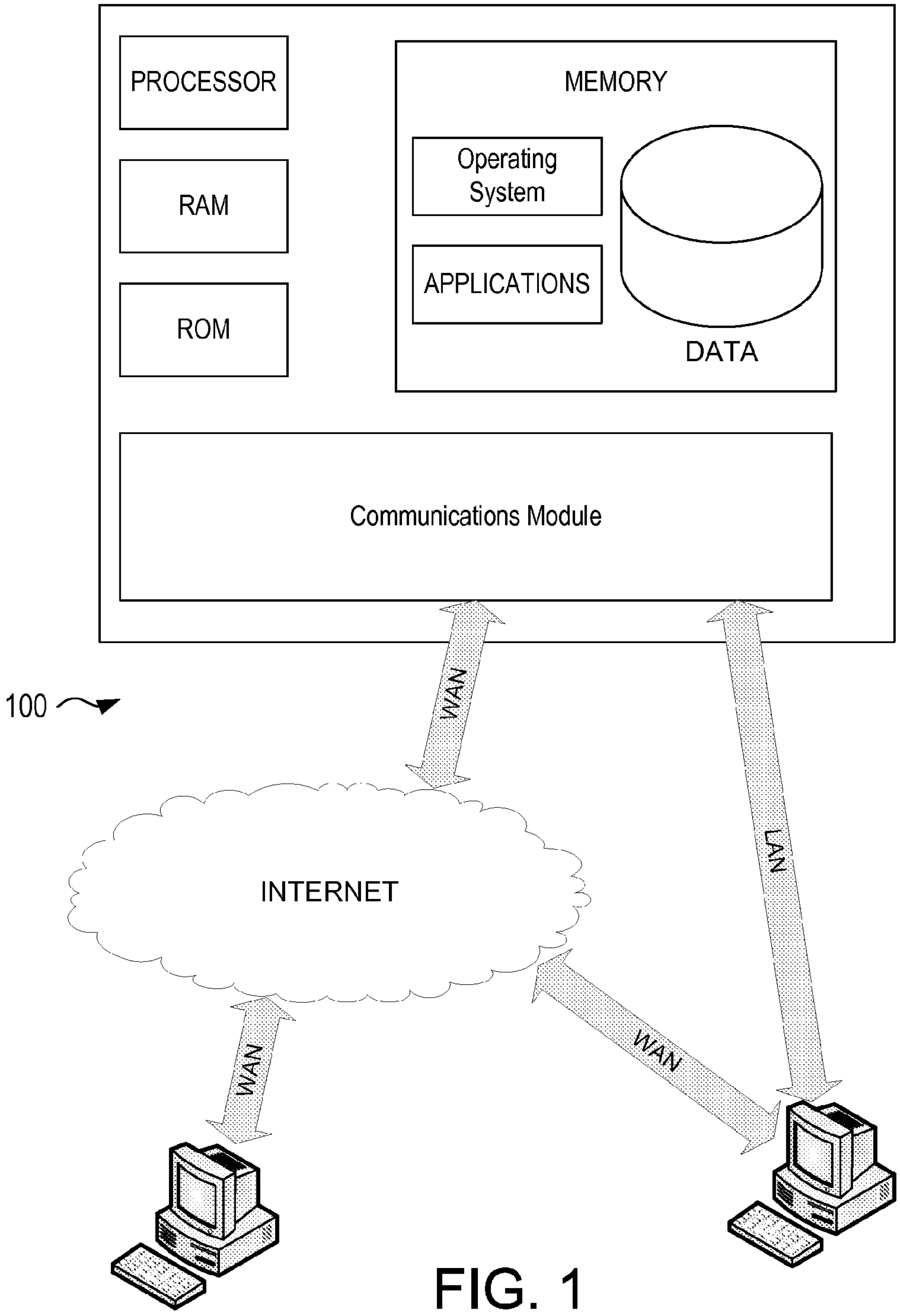
FIG. 1 shows an illustrative environment 100 in accordance with aspects of the disclosure.
Figure 2:
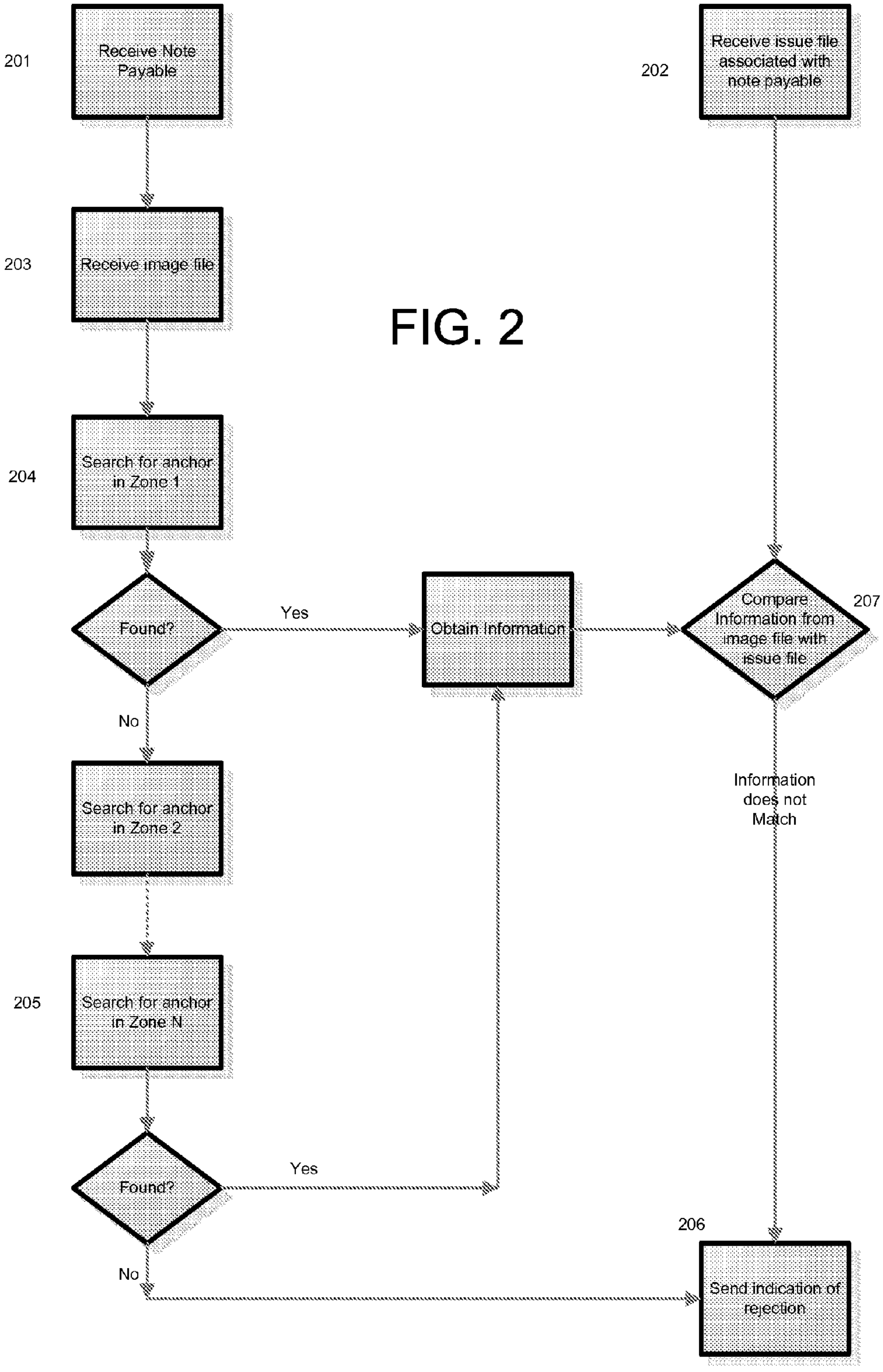
FIG. 2 shows a flow chart illustrating a method for processing note payables in accordance with aspects of the disclosure.

FIG. 2 shows a flow chart illustrating a method for processing note payables in accordance with various aspects of the disclosure. As shown in steps 201 and 202, a bank receives note payables used by its account holders and in some cases an associated issue file contains pertinent information about the note payable. Note payables may include checks of all forms (e.g., personal checks, cashier's checks, money orders) and do not necessarily have to come in paper form. Issue files may be received in electronic form such as in text file format, or text based electronic formats.

Although the institution using the method has been described as a bank, the method could also be used by various financial institutions, including but not limited to check processing facilities, and banking kiosks.

In step 203, the bank receives an image file from the note payable in electronic form to perform further processing. Receiving an image file of a note payable can be done in various ways. A bank can directly obtain the image file from a note payable through use of an image-input device such as a scanner, digital camera, multi-function office device or other image-input device well known to those skilled in the art. A bank could also obtain an image file of a note payable indirectly through an account holder or a third party.

In step 204, a bank may search for an anchor within an image file of a note payable. A bank may execute the search by using optical character recognition software ("OCR") to read and search for letters, words and phrases found within an image file. However, a bank is not limited to the use of OCR in executing a search for an anchor, but could use any technology that translates information found on paper into information in electronic form.

Figure 4:
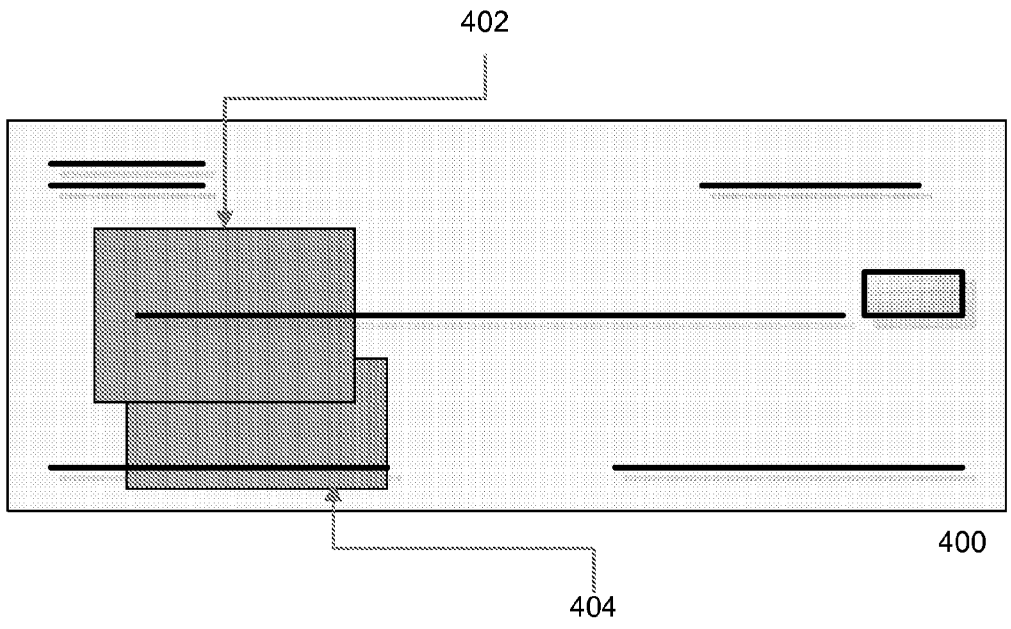
FIG. 4 shows anchors in a note payable's image in accordance with aspects of the disclosure.

A bank may search for an anchor in a particular zone or area of a note payable's image (400) as shown in FIG. 4, element 402. If the sought anchor is not found, it may search for the anchor in another zone (404) of the image file. As illustrated by steps 204 and 205, searches for the anchor in an image file may be done multiple times and in multiple zones within the note payable's image file, however a bank may desire.

Figure 3:
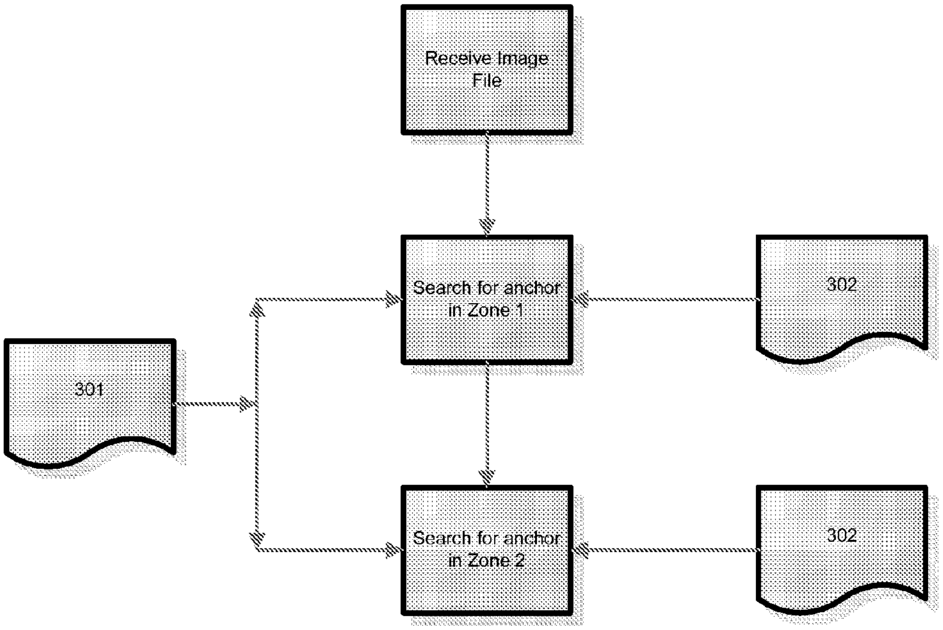
FIG. 3 shows one embodiment where a bank may search for an anchor within an image file twice in accordance with aspects of the disclosure.

In one embodiment of the method, as shown in FIG. 3, a bank may search for an anchor within an image file twice, searching two different zones of the image file. A further embodiment of this method includes receiving the coordinates of each search zone, in relation to the image file. This information can be received through an electronic file and/or through an electronic transmission. As shown in FIG. 3, element 301, the coordinates of each search zone can be received from one file. As shown by FIG. 3, element 302, the coordinates of each search zone can be received from separate files, each file containing particular coordinates of one search zone. This information could also be entered in manually by a user.

A user may convey the coordinates of the different zones through a user-defined template or a positive pay form that corresponds with the format of note payables a bank commonly receives. The information could also be conveyed through other options known by those skilled in the art.

The anchor can be any single character or set of characters defined by a bank. The anchor is not limited to characters but can also include symbols, emblems, logos or other various informational marks that can be found within a note payable. In one embodiment of the method, an anchor may be: "Pay to order."

As illustrated in FIG. 2 step 206, if the anchor is not found after multiple zones within a note payable have been searched, an indication of rejection is sent. This indication of rejection can be electronically displayed for a user. Indications of rejections can also be listed in an electronic file (e.g., a log file).

One embodiment of the method includes setting aside a rejected note payable for further processing. Further processing may be done manually by a user, may subject a rejected note payable to another run through the method, or may subject a rejected note payable to other processes known to those skilled in the art.

If the anchor is found within one of the multiple search zones of a note payable, then the information associated with the anchor is obtained. This information may be read or obtained by any technology or software that is able to interpret information from the note payable into electronic form such as OCR. The information associated with the anchor can be characters or strings of characters that, as known by those skilled in the art, are found on note payables. The information may include but is not limited to: payee name, transaction amount, payee address, payee signature and date. The information may be situated to the right of an anchor. The information may also be situated in other areas of the image file, and may be obtained from any area of the image file in relation to an anchor if the user so desires.

At Step 207, the obtained information associated with the anchor is then compared to corresponding information within the issue file associated with the note payable. For example, the method can compare a payee's name on a note payable to the payee's name within the note payable's associated issue file. If the information obtained from the image file does not match the corresponding information from the issue file, then an indication of rejection is sent to the user. This indication of rejection can be electronically displayed for a user. Indications of rejections can also be listed in an electronic file. An indication of rejection can be manifested as the setting aside of a particular rejected note payable. Further processing may be done manually by a user, may subject a rejected note payable to another run through the method, or may subject a rejected note payable to other processes known to those skilled in the art.

In one embodiment of the method, multiple distinct anchors may be used and searched for in the different multiple zones within the image file. Different anchors may have different types of information associated with them. For example, the system may search for the anchor, "Pay to the order," and obtain the payee's name information, and also search for the anchor, "Date," and obtain the date information from the note payable, while searching in the multiple zones of the image file. In yet another example, the system may search for the anchor, "Pay to the order," and also search for the anchor, "Payee" in the same zone (or multiple zones) to obtain the payee's name information.

Although the steps of the method have been described in a particular order, they do not have to be executed in that fashion. The order of the steps can be executed in a different order as one skilled in the art may see fit.

Figure 5:
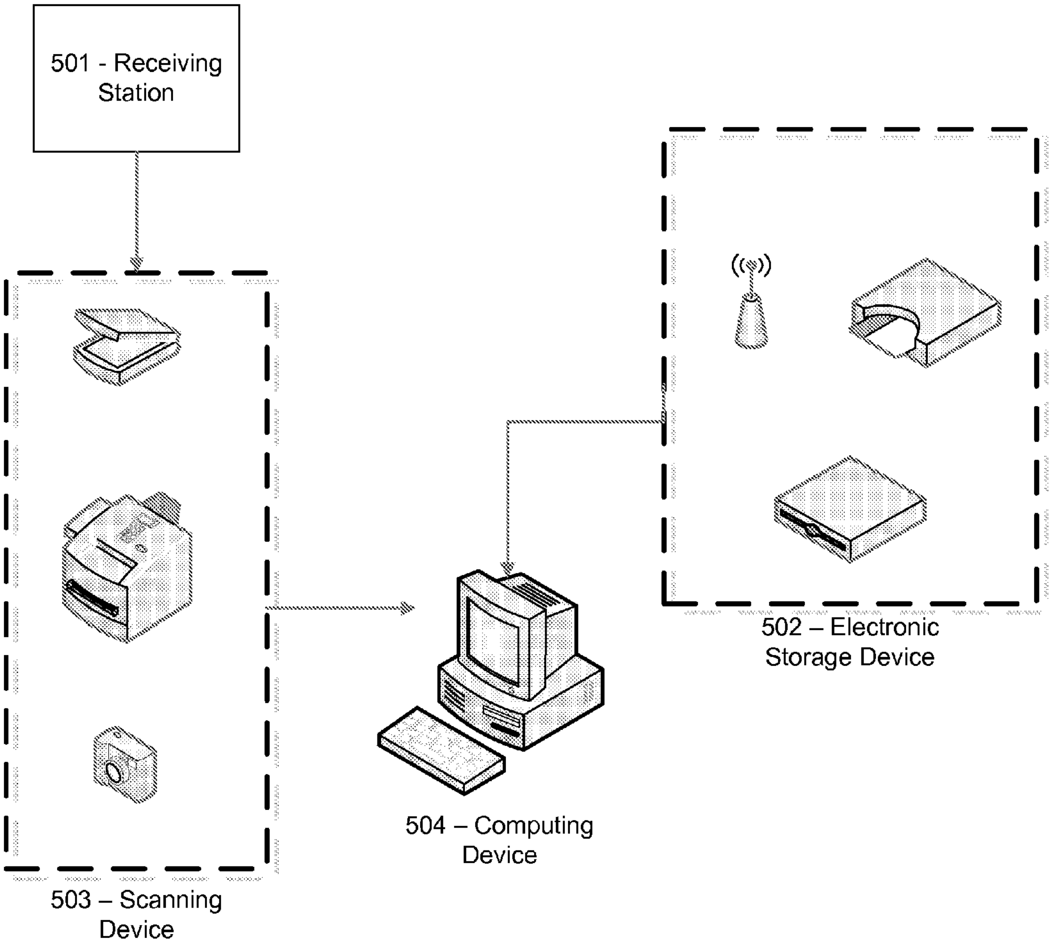
FIG. 5 shows an illustrative system in which various aspects and embodiments of the invention may be implemented.

An example of an illustrative system in which various aspects and embodiments of the invention may be implemented is shown in the simplified diagram in FIG. 5. The illustrative system of FIG. 5 is only one example of a suitable system and is not intended to suggest any limitation as to the scope of use or functionality of the invention. Suitable environments for use with the invention include a receiving station 501 and a computing device 504 or system that supports interaction with scanning devices 503 (e.g., digital camera, document scanner, multi-function office device) and electronic storage devices 502 (e.g., hard disks, flash memory drives).

An embodiment of the system includes a receiving station 501 where note payables may be received. The receiving station could be manifested in various different embodiments such as a physical receiving area within a bank's premises. It could also be manifested as a computing device or computing server device which receives electronic forms of note payables directly through tangible computer readable media or through internet communication.

Electronic storage devices 502 may provide communication of issue files associated with received note payables to the illustrative system of FIG. 5. Different electronic storage devices are disclosed such as a hard drive of a computing device and a flash memory storage device. However, the electronic storage devices are not limited to these particular devices in relaying issue files to the system but can include other devices that one skilled in the art would use for such a task. The system may also access issue files through internet or network communication which may then be stored onto the local computing device's hard drive or stored onto another electronic storage device.

In accordance with aspects of the invention, the scanning device 503 may be comprised of an electronic check scanner device, flatbed scanner, a digital camera, multi-purpose office machine, or any other device that permits the capturing of an image using a sensor (e.g., an optical sensor). These scanning devices 503 may store the image data they capture into a portion of the memory in the scanning device (or on an electronic storage device 502). An electronic storage device on the computing device 504 may also be used to store the image data captured by the scanning device. In addition, in various embodiments in accordance with aspects of the invention, the scanning device may store a unique identifier (e.g., an IP address) corresponding to the device (e.g., document scanner, multi-purpose office machine, digital camera, electronic paper check scanner) As such, the scanning device may be identifiable and addressable by a device external to this process.

In accordance with various aspects of the disclosure, illustrated in FIG. 5 is a computing device 504 in communication with a scanning device 503 and electronic storage devices 502. The computing device 504 may be a user's personal computer or a computing device dedicated for processing note payables at the users place of business. Other embodiments may include computing devices used for executing methods similar to the aspects of the disclosure by those skilled in the art.

The computing device 504, as is known to those skilled in the art, may be comprised of a memory storing computer-executable instructions and a processor for executing the instructions. The instructions may enable the computing device 504 to receive image data from a scanning device 503. Programs, comprising sets of instructions and associated data, may be stored in the computing device's memory, from which they can be retrieved and executed by the processor. Among the programs and program modules stored in the memory are those that comprise or are associated with an operating system as well as application programs including those that perform steps in accordance with the disclosure. The memory may also include a cache to enhance device performance.

Various steps, such as those described earlier, may be performed by the system of FIG. 5. For example, the computing device 504 may comprise software modules to electronically compare the information received from an image file with information in the issue file to determine whether additional manual processing is desired. Moreover, such a software module (e.g., computer-executable instructions on a tangible computer-readable medium) may be enhanced by reducing the comparison to a loose match. For example, rather than simply comparing the entire payee's name stored in the issue file with the entire length of information retrieved from the image file to determine if a match exists, the computing device 504 may use loosely match the payee's name by comparing just the first five and last five characters of the payee's name. One skilled in the art will appreciate that more than or less than five characters may be used for this loose matching approach. At least one benefit of a loose matching approach is the enhanced efficiency with which notes payables may be processed without a notable increase in fraud risk and bank (e.g., check clearinghouse) liability.

Moreover, the loose matching aspect of disclosure may be implemented in various forms. For example, the computing device 504 may compare the first five letters of a payee's first name and first five letters of a payee's last name. Alternatively, the number of letters compared may be more than or less than five (i.e., any predetermined number).

Another embodiment of the disclosure includes forms of computer-readable media. Computer-readable media include any available media that can be accessed by a computing device. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the disclosure is contemplated. In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

I claim:

1. A method comprising:

receiving, by a computing device, an image of a note payable;

receiving, by the computing device, issue information associated with the note payable, the issue information being received via an electronic issue file created by an issuer of the note payable, the electronic issue file including information about the note payable as originally issued;

receiving, by the computing device, a zone file, the zone file including first coordinates defining first dimensions of a first zone of the image and including second coordinates defining second dimensions of a second zone of the image, wherein the second coordinates are different from the first coordinates;

searching, by the computing device, for a first anchor in the first zone of the image;

searching, by the computing device, for a second anchor in the second zone of the image;

after locating the first anchor, obtaining, by the computing device, first anchor information from the image, the first anchor information being associated with and located adjacent the first anchor;

after locating the second anchor, obtaining, by the computing device, second anchor information from the image, the second anchor information being associated with and located adjacent the second anchor;

determining, by the computing device, whether the first anchor information matches a first portion of the issue information corresponding to the first anchor information;

determining, by the computing device, whether the second anchor information matches a second portion of the issue information corresponding to the second anchor information; and determining, by the computing device, to send an indication of rejection when the first anchor information is determined to not match the first portion of the issue information and when the second anchor information is determined to not match the second portion of the issue information.

2. The method of claim 1, further comprising:

determining, by the computing device, to set aside the note payable for further manual processing when it is determined to send the indication of rejection.

3. The method of claim 1, further comprising:

receiving, by the computing device, a first file and a second file, the first file defining first dimensions of the first zone and the second file defining second dimensions of the second zone.

4. The method of claim 1, wherein the note payable is a check.

5. The method of claim 1, wherein the first anchor information is a name of a payee of the note payable.

6. The method of claim 1, wherein the first anchor is a first set of characters that includes "pay to order" and the second anchor is a second set of characters that includes "payee".

7. The method of claim 1, further comprising:

determining, by the computing device, that the first anchor information matches the first portion of the issue information when a first predetermined number of characters of the first anchor information matches the first predetermined number of characters of the first portion of the issue information, the first predetermined number of characters being less than the total number of characters in the first anchor information; and determining, by the computing device, that the second anchor information matches the second portion of the issue information when a second predetermined number of characters of the second anchor information matches the second predetermined number of characters of the second portion of the issue information, the second predetermined number of characters being less than the total number of characters in the second anchor information.

8. The method of claim 1, further comprising:

determining, by the computing device, that the first anchor information matches the first portion of the issue information when the first five characters of the first anchor information match the first five characters of the first portion of the issue information and when the last five characters of the first anchor information match the last five characters of the first portion of the issue information, wherein the first anchor information includes a name of a payee of the note payable and the first portion of the issue information also includes the name of the payee of the note payable.

9. A non-transitory computer readable medium storing computer-executable instructions that, when executed, cause at least one processor to:

receive an image of a note payable;

receive issue information associated with the note payable, the issue information being received via an electronic issue file created by an issuer of the note payable, the electronic issue file including information about the note payable as originally issued;

receive a zone file, the zone file including first coordinates defining first dimensions of a first zone of the image and including second coordinates defining second dimensions of a second zone of the image, wherein the second coordinates are different from the first coordinates;

search for a first anchor in the first zone of the image;

search for a second anchor in the second zone of the image;

after locating the first anchor, obtain first anchor information from the image, the first anchor information being associated with and located adjacent the first anchor;

after locating the second anchor, obtain second anchor information from the image, the second anchor information being associated with and located adjacent the second anchor;

determine whether the first anchor information matches a first portion of the issue information corresponding to the first anchor information;

determine whether the second anchor information matches a second portion of the issue information corresponding to the second anchor information; and determine to send an indication of rejection when the first anchor information is determined to not match the first portion of the issue information and when the second anchor information is determined to not match the second portion of the issue information.

10. The non-transitory computer readable medium of claim 9, wherein the note payable is a check.

11. The non-transitory computer readable medium of claim 9, having additional computer-executable instructions stored thereon that, when executed, further cause the at least one processor to:

determine that the first anchor information matches the first portion of the issue information when a first predetermined number of characters of the first anchor information matches the first predetermined number of characters of the first portion of the issue information, the first predetermined number of characters being less than the total number of characters in the first anchor information; and determine that the second anchor information matches the second portion of the issue information when a second predetermined number of characters of the second anchor information matches the second predetermined number of characters of the second portion of the issue information, the second predetermined number of characters being less than the total number of characters in the second anchor information.

12. An apparatus, comprising:

at least one processor; and memory storing computer-readable instructions that, when executed by the at least one processor, cause the apparatus to:

receive an image of a note payable;

receive issue information associated with the note payable, the issue information being received via an electronic issue file created by an issuer of the note payable, the electronic issue file including information about the note payable as originally issued;

receive a zone file, the zone file including first coordinates defining first dimensions of a first zone of the image and including second coordinates defining second dimensions of a second zone of the image, wherein the second coordinates are different from the first coordinates;

search for a first anchor in the first zone of the image;

search for a second anchor in the second zone of the image;

after locating the first anchor, obtain first anchor information from the image, the first anchor information being associated with and located adjacent the first anchor;

after locating the second anchor, obtain second anchor information from the image, the second anchor information being associated with and located adjacent the second anchor;

determine whether the first anchor information matches a first portion of the issue information corresponding to the first anchor information;

determine whether the second anchor information matches a second portion of the issue information corresponding to the second anchor information; and determine to send an indication of rejection when the first anchor information is determined to not match the first portion of the issue information and when the second anchor information is determined to not match the second portion of the issue information.

13. The apparatus of claim 12, wherein the memory stores additional computer-readable instructions that, when executed by the at least one processor, further cause the apparatus to:

determine to set aside the note payable for further manual processing when it is determined to send the indication of rejection.

14. The apparatus of claim 12, wherein the note payable is a check.

15. The apparatus of claim 12, wherein the first anchor information is a name of a payee of the note payable.

16. The apparatus of claim 12, wherein the first anchor is a first set of characters that includes "pay to order" and the second anchor is a second set of characters that includes "payee".

17. The apparatus of claim 12, wherein the memory stores additional computer-readable instructions that, when executed by the at least one processor, further cause the apparatus to:

determine that the first anchor information matches the first portion of the issue information when a first predetermined number of characters of the first anchor information matches the first predetermined number of characters of the first portion of the issue information, the first predetermined number of characters being less than the total number of characters in the first anchor information; and determine that the second anchor information matches the second portion of the issue information when a second predetermined number of characters of the second anchor information matches the second predetermined number of characters of the second portion of the issue information, the second predetermined number of characters being less than the total number of characters in the second anchor information.

18. The apparatus of claim 12, wherein the memory stores additional computer-readable instructions that, when executed by the at least one processor, further cause the apparatus to:

determine that the first anchor information matches the first portion of the issue information when the first five characters of the first anchor information match the first five characters of the first portion of the issue information and when the last five characters of the first anchor information match the last five characters of the first portion of the issue information, wherein the first anchor information includes a name of a payee of the note payable and the first portion of the issue information also includes the name of the payee of the note payable.

19. The method of claim 1, wherein the second anchor is different from the first anchor, and wherein the second zone is different from the first zone.

20. The non-transitory computer readable medium of claim 9, wherein the second anchor is different from the first anchor, and wherein the second zone is different from the first zone.

21. The apparatus of claim 12, wherein the second anchor is different from the first anchor, and wherein the second zone is different from the first zone.

* * * * *